United States Patent [19]

Chaput et al.

[11] Patent Number: 5,017,534

[45] Date of Patent: May 21, 1991

[54] METHOD FOR THE FABRICATION OF A CERAMIC MATERIAL BY HYBRID CHEMICAL PROCESS AND MATERIAL OBTAINED THEREBY

[75] Inventors: Frédéric Chaput, Massy; Jean-Pierre Boilot, Meudon la Foret, both of France

[73] Assignee: Compagnie Europeenne de Composants Electroniques -LCC, Courbevoie, France

[21] Appl. No.: 400,708

[22] Filed: Aug. 30, 1989

[30] Foreign Application Priority Data

Sep. 2, 1988 [FR] France ................................ 88 11498

[51] Int. Cl.$^5$ ........................ C04B 35/46; C04B 35/48
[52] U.S. Cl. ................................... 501/134; 501/137; 501/138; 423/71
[58] Field of Search ................. 501/134, 12, 128, 137, 501/136, 138; 423/71

[56] References Cited

U.S. PATENT DOCUMENTS

| | | | |
|---|---|---|---|
| 3,292,994 | 12/1966 | Kiss et al. | |
| 4,636,378 | 1/1987 | Pastor et al. | 423/598 |
| 4,643,984 | 2/1987 | Abe et al. | 501/134 |
| 4,789,653 | 12/1988 | Ogata et al. | 501/134 |

FOREIGN PATENT DOCUMENTS

| | | |
|---|---|---|
| 0079392 | 5/1983 | European Pat. Off. |
| 0250085 | 12/1987 | European Pat. Off. |
| 2568239 | 1/1986 | France |

OTHER PUBLICATIONS

The Journal of American Chemical Society, vol. 77, Dec. 5, 1955, p. 6194, S. S. Flaschen, "An Aqeuous Synthesis of Barium Titanate".

Patent Abstract of Japan, vol. 8, No. 41, (C-211) (1478), Feb. 22, 1984, Y. Ozaki, "Manufacture of Solid Solution of Metallic Oxide".

Science of Ceramics 14 (1988), Jul. 1988, "Sintering and Dielectric Properties of Sol-Gel Ba/Sr Titanate Ceramics", F. Chaput and J. P. Boilot.

Journal of Materials Science Letters 6 (1987), pp. 1110–1112, 1987, Chapman and Hall Ltd.

High Tech Ceramics, Edited by P. Vincenzini, Elsevier Science Publishers, B.V.; Amsterdam, 1987; "Chemically Derived Ba Titanate Gels and Ceramics".

*Primary Examiner*—William R. Dixon, Jr.
*Assistant Examiner*—Alan Wright
*Attorney, Agent, or Firm*—Oblon, Spivak, McClelland, Maier & Neustadt

[57] ABSTRACT

The disclosure concerns the fabrication, by chemical process, of a ceramic material belonging to the system:

$$Ba_xSr_{1-x}(Ti_uZr_vHf_w)O_3$$

The fabrication method comprises the following steps:
 preparation of an alcohol solution containing at least one titanium, zirconium or hafnium alcoholate,
 preparation of a determined quantity of hydrated barium hydroxide and/or hydrated strontium hydroxide in solid state;
 under violent shaking, dissolving of the hydroxide or hydroxides in the alcohol solution, and continuing of the reaction until a paste is obtained,
 drying of the paste obtained.

9 Claims, 6 Drawing Sheets

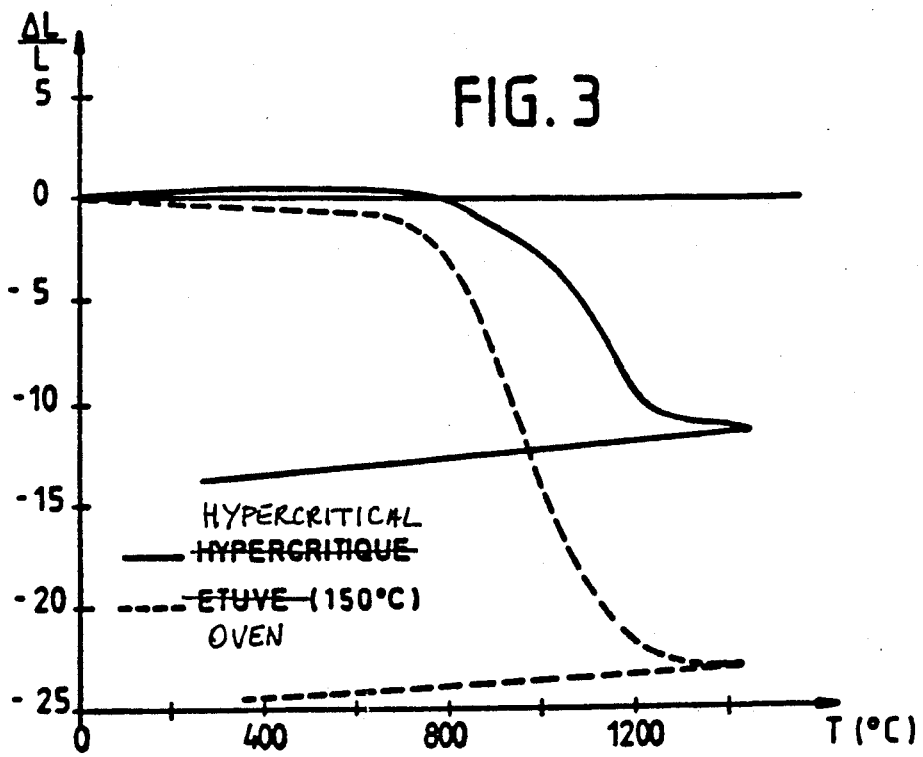
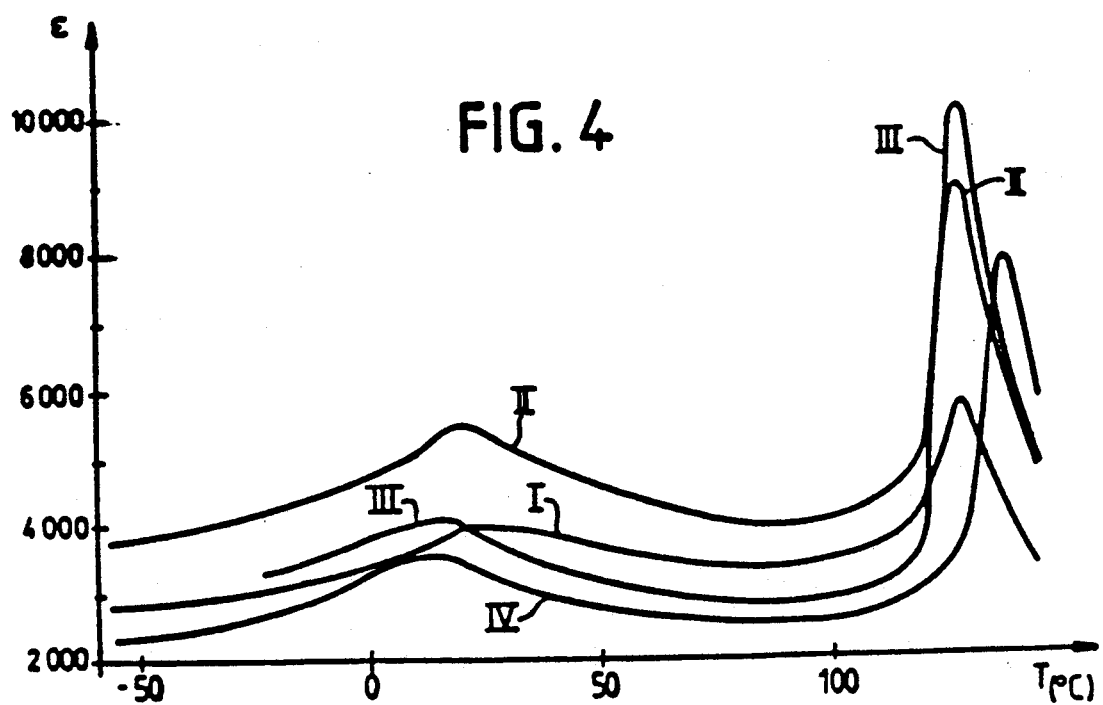

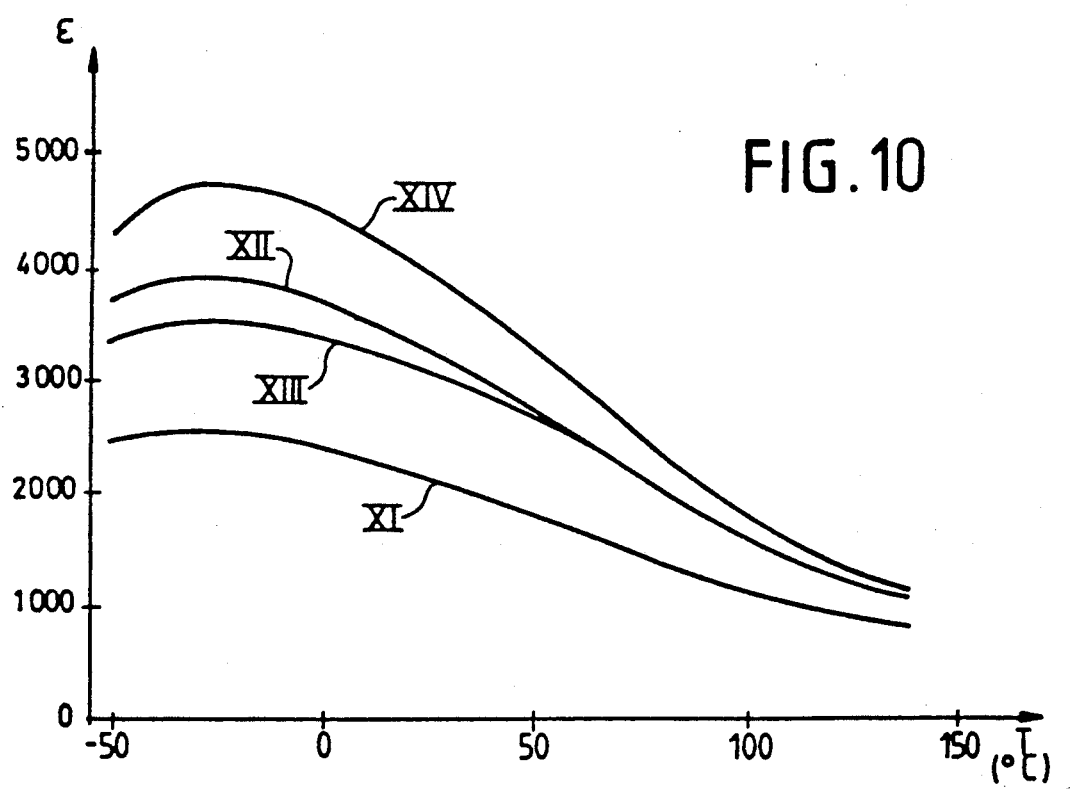
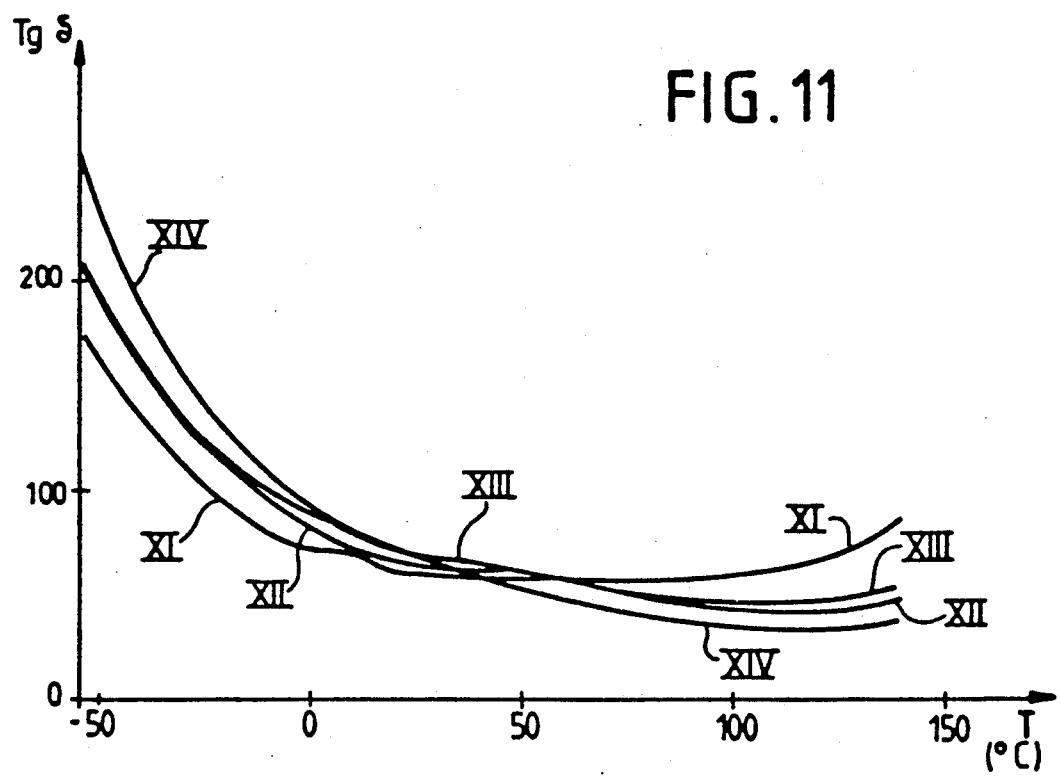

METHOD FOR THE FABRICATION OF A CERAMIC MATERIAL BY HYBRID CHEMICAL PROCESS AND MATERIAL OBTAINED THEREBY

BACKGROUND OF THE INVENTION

1. Field of the Invention

The present invention concerns a new method for the fabrication of ceramic material, chiefly with a perovskite structure, by hybrid chemical process, in using a mixture of mineral precursors and organic precursors.

2. Description of the Prior Art

To define a ceramic, we might refer to the article by J-M Haussonne in *Techniques de l'Ingenieur*, E 1820, p. 3 (March 1986), which gives the following definition:

"A ceramic is a polycrystalline inorganic material, showing a complex microstructure of grains and grain boundaries. This structure is defined during the preparation cycle which converts raw materials, which are most often powdery, into a dense material that is ideally free of pores and has properties derived from those of its grains as well as from its heterogeneity. The essential technological stage in the preparation of a ceramic is its sintering, which is the temperature-atmosphere-time cycle during which the grains initially put into contact with one another by shaping operations get bound together through the effect of various transport mechanisms, and then acquire the desired microstructure".

It is known that, in the field of industrial ceramics, used notably in electronics, very special importance is attached to the development of powders derived by chemical process. These powders have definite advantages over the powders obtained by reaction in the solid state. These advantages are increased homogeneity and purity, easy control over the stoichiometry, high reactivity increasing the reaction kinetics and reducing the sintering temperatures (entailing in the elimination of lengthy, pollution-causing crushing operations), and the obtaining of a narrow grain size distribution enabling the growth of the grains to be controlled. However, apart from the drawbacks specific to these methods (namely, a large number of steps, very complicated chemistry for the formation of the precursors, a difficult calcination cycle—it sometimes implies the reduction of the specific surface area in a manner that substantially leads to fairly smooth grains that are often hard to sinter—, the presence of agglomerates with varying degrees of solidness depending on the powder drying and washing techniques), there is one drawback that concerns the relatively high cost of these preparation techniques.

In the field of capacitors, current trends, for nearly ten years, has been going towards the making of ceramic capacitors with high volume capacities (their development is closely linked to that of microelectronics) and towards the reduction of the cost of this type of component.

One approach envisaged consists in the use of dielectric materials, generally based on barium titanate, derived by chemical processes. These materials have improved dielectric properties (in particular, the increase in the dielectric constant owing to the purity of the precursors and the possibility of centering the distribution in size at an optimum value) and get sintered at lower temperatures. However, the often high cost price of powders derived by chemical methods has not yet permitted industrial-scale development.

In the field of high frequency applications (microwaves), the dielectric resonators that are made should have a dielectric constant of more than 30, low losses (with a quality factor of more than 10,000) and a resonance frequency temperature coefficient of some ppm/°C. These conditions of use very often call for the making of complex dielectric compounds with perovskite structure. Chemical methods are probably indispensable to obtain the perfect homogeneity of these ceramics.

Besides, it is known that positive temperature coefficient resistors (PTC thermistors) are made with barium titanate and that the amplitude of the resistivity jump is improved by the use of purer basic materials and by a more homogeneous distribution of the different dopants. The basic price of these components does not presently allow the use of the barium titanates prepared by liquid process owing to their excessively high cost.

The use of "soft" chemisty techniques to fabricate perovskite structure materials is not a new idea, and several methods are known. One known method is the coprecipitation method. In particular, the formation of barium and titanium double citrates or oxalates by precipitation of aqueous solutions Ti-Ba by the addition of oxalic or citric acid. This technique is described in W. S. Clabaugh, E. M. Swiggard and R. Gilchrist, "Preparation of Barium Titanyl Oxalate Tetrahydrate for Conversion to Barium Titanate of High Purity", J. Research N. B. S. 56, 5, 289 (1956) and in the U.S. Pat. No. 3,231,328. This technique has several drawbacks:

i. The operations for filtering and washing the precipitate as well as the unwanted precipitation of $TiO_2$ make it difficult to control the stoichiometry.

ii. A calcination step is needed to decompose the double salt.

iii. The decomposition of the double salt does not lead directly to $BaTiO_3$, because of the formation of carbonated intermediate products during the combustion of oxalate or citrate ions. Consequently, the sintering temperature remains high (1350° C).

iv. The preparation of complex compounds by controlled precipation of a large number of elements is difficult.

The sol-gel technique is also known, notably from the U.S. Pat. No. 3,647,364. This technique entails the making of an amorphous gel by hydrolysis-condensation of a mixture of barium and titanium alkoxides in alcohol solution. For example, barium isopropoxide $Ba(C_3H_7O)_2$ and titanium butoxide $Ti(C_4H_9O)_4$ are hydrolyzed by an excess of water. The amorphous gel crystallizes at low temperature (500° C) into very fine particles (5-10 nm). The following are the drawbacks of this technique:

i. The ultrafine powder, with a large specific surface area (50-70 $m^2/g$) easily forms agglomerates, and its shaping requires a preliminary calcination.

ii The very high reactivity to air of the barium alkoxides (hydrolysis) and of the amorphous gel (carbonation) requires implementation in inert atmosphere.

There is yet another known technique using barium hydroxide (see, inter alia, U.S. Pat. No. 3,292,994). The preparation of barium titanate, crystallized by the addition of a titanium alkoxide (for example Ti(O $Pr_4$) to an aqueous solution of a barium salt, with a pH factor ranging from 11 to 14, has been reported by S. S. Flashen (J. Am. Chem. Soc. 77(1955)6194).

The main reactions that come into play during the process are:

$$Ti(OR)_4 + Ba^{2+} + 2OH^- + 4HO_2 \rightarrow Ti(OH)_6^{2-} + Ba^{2+} + 4ROH \quad [1]$$

$$Ti(OH)_6^{2-} + Ba^{2+} \rightarrow Ba\,TiO_3 + 3H_2O \quad [2]$$

In following the procedure described by Flashen, particles of $BaTiO_3$ with a size of 1–5 μm are obtained. The problem with this method is that of achieving the reactions completely. In effect, the formation of $BaTiO_3$ leads to a gradual lowering of the concentration of the elements Ba and Ti in the solution and to a drop in the pH. Consequently, the reaction kinetics are gradually reduced, the reactions 1 and 2 are not total and the stoichiometry Ba/Ti is smaller than 1 and not reproducible. Several modifications have been proposed to improve this method:

The use of an excess of barium. The powder is then very sensitive to carbonation.

Hydrothermal synthesis (see, in particular, DE 3 26 674). Under conditions of 120°–300° C. and 0.5–5 MPa, $BaTiO_3$, $SrTiO_3$, and $PbTiO_3$ powders have been prepared. Apart from the complexity of the method, the reactions do not seem to be complete, and the stoichiometry cannot be controlled.

To overcome these drawbacks, the invention proposes a simple method of fabrication, without the use of an inert atmosphere giving, within a wide range of compositions, ceramic powders that are crystallized after drying and have stoichiometry that can be controlled. The specific surface area of 10 to 20 m²/g enables direct shaping without prior calcination. The powders can be sintered at low temperature (1150° C. for $BaTiO_3$). The simplicity of the equipment used, as well as the low cost of the raw materials, may make it easy to develop this technique on an industrial scale. The method is derived from the technique proposed by Flashen for the synthesis of $BaTiO_3$. It consists in using an alkaline-earth hydroxide (Ba-Sr) hydrated in solid state, in dissolving it in an alcohol medium containing alkoxides. The dissolving is quickly followed by the reactions of hydrolysis-condensation of the alkoxides by the hydration water of the initial hydroxide, and the liquid mixture gradually changes towards the state of a homogeneous paste. The high concentration of the elements and the OH⁻ ions in the liquid as well as the strong shaking that is kept up throughout the operation make it possible to achieve complete reactions and obtain a crystallized perovskite composition with controlled stoichiometry.

SUMMARY OF THE INVENTION

An object of the invention, therefore, is a method for the fabrication, by chemical process, of a ceramic material belonging to the system:

$$Ba_xSr_{1-x}(Ti_uZr_vHf_w)O_3 \quad (3)$$

with $0 \leq x \leq 1$, where the coefficients u, v and w may be zero, but at least one of them is not zero, said method comprising the following steps:

preparation of an alcohol solution containing at least one titanium, zirconium or hafnium alcoholate, preparation of a determined quantity of hydrated barium hydroxide and/or hydrated strontium hydroxide in solid state;

under violent shaking, dissolving of the hydroxide or hydroxides in the alcohol solution, and continuing of the reaction until a paste is obtained, drying of the paste obtained, Another object of the invention is a ceramic material obtained by the above method, wherein:

$$0.95 \leq u + v + w \leq 1.05.$$

BRIEF DESCRIPTION OF THE DRAWINGS

The invention will be better understood and other advantages will appear from the following detailed description, given as a non-restrictive example, and from the appended drawings, of which:

FIG. 3 is a graph showing curves of shrinkage as a function of temperature;

FIGS. 4 to 11 are graphs illustrating the dielectric properties of materials obtained by the method according to the invention.

DESCRIPTION OF PREFERRED EMBODIMENTS

Figure 1:
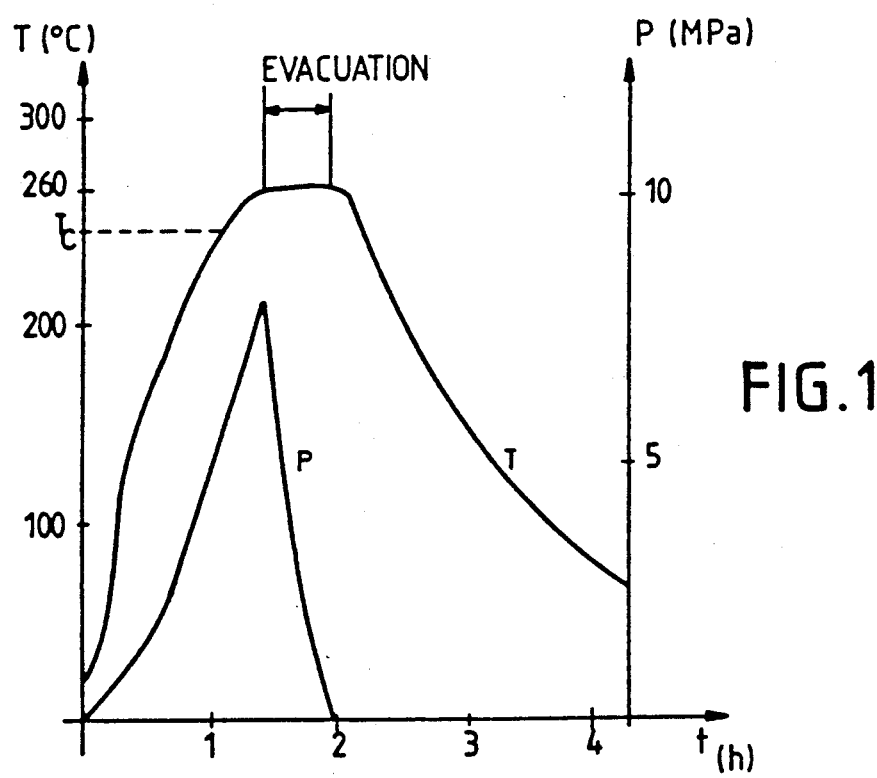
FIG. 1 is a graph representing the changes in the temperature and the pressure prevailing in an autoclave as a function of time.

The invention can be applied more precisely to the synthesis of powders of ceramic materials belonging to the system $Ba_xSr_{1-x}(Ti_uZr_vHf_w)O_3$ wherein x is between 0 and 1 and the sum $u+v+w$ is between 0.95 and 1.05.

Again according to the invention, it is easy to make substitution (homogeneously at the molecular level) during the synthesis of the powders. In particular, the titanium, zirconium and hafnium atoms may be substituted partially or totally:

either by a mixture of elements M and M' in respective proportions of ⅔ and ⅓. For example, in the case of a total substitution of the titanium atoms, $Ti^1$ is replaced by $M_{2u/3}M'_{u/3}$ in the formula 3 with M which represents at least one metal chosen from among tantalum and niobium, and M' which represents at least one metal chosen from among magnesium, zinc and manganese. Among these compositions, we might cite, in particular, $Ba(Ta_{⅔}Mg_{⅓})O_3$.

or by a mixture of elements M and M" in respective proportions of ¾ and ¼. For example, in the case of a total substitution of the titanium atoms, $Ti_u$ is replaced by $M_{3u/4}M''_{u/4}$ in the formula 3 with M which represents at least one metal chosen from among tantalum and niobium, and M" which represents at least one metal chosen from among lithium, sodium and potassium. Among these compositions, we might cite, in particular, $Ba(Nb_{¾}Li_{¼})O_3$.

Again according to the invention, dopant elements can be easily introduced (homogeneously at the molecular level) during the synthesis of the powders. These dopants may be chosen from among calcium $Ca^{II}$, magnesium $Mg^{II}$, zinc $Zn^{II}$, the ions of the transition metals such as niobium $Nb^V$, tantalum $Ta^V$, copper $Cu^{II}$ manganese $Mn^{II}$, cobalt $Co^{II}$, the alkaline ions, lanthanum $La^{III}$, yttrium $Y^{III}$, antimony $Sb^{III}$, lead $Pb^{II}$.

After shaping and sintering, these ceramic materials can be used in electronics (for capacitors of differents classes, thermistors etc.). The invention has the advantage of using starting precursors with a well known chemistry, used in industries other than the ceramics industry. These ceramics are available at modest cost.

In the system considered above, the elements of the titanium sub-group (titanium, zirconium, hafnium) are introduced by means of precursors chosen from among the metallic alcoholates (or alkoxides), for example: $Zr(OR)_4$, $Ti(OR)_4$ and $Hf(OR)_4$, with R representing an alkyl grouping that may contain 1 to 5 carbon atoms. The alcoholates (or alkoxides) used as a starting product, as well as their properties, are well known. They may be prepared according to the general methods described in the literature on the subject, for example in the article by D. C. Bradley: "Metal Alkoxides" in Progress Inorg. Chem. 2, 1960, 303-361. Among the raw materials that can be used as a starting product in the method of the invention, we might cite, notably:

$Zr(C_3H_7O)_4$ liquid zirconium propylate
$Zr(C_4H_9O)_4$ liquid zirconium butylate
$Ti(C_3H_7O)_4$ liquid titanium isopropylate
$Ti(C_4H_9O)_4$ liquid titanium butylate
$Hf(C_4H_9O)_4$ liquid hafnium butylate The barium and the strontium are introduced in the form of hydrated hydroxides $Ba(OH)_2, nH_2O$ and $Sr(OH)_2, nH_2O$ (preferably, n is equal to 8).

If the ceramic material has to include one or more substituents or dopants, these may be introduced in different forms. They may be introduced in the form of metallic alcoholates (or alkoxides), for example $Nb(OR)_5$, $Ta(OR)_5$, $LiOR$, $Mg(OR)_2$, $Sb(OR)_5$, $La(OR)_3$, etc. Should these products be in solid form, it would be appropriate to use a solvent, for example, methanol, ethanol, propanol and butanol.

It is also possible to introduce these dopants in the form of metallic salts (preferably nitrates) soluble in alcohols.

The main reactions that come into play during this process are, in the particular case of the compound Ba Ti $O_3$, the following:

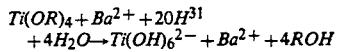
$$Ti(OR)_4 + Ba^{2+} + 2OH^{-} + 4H_2O \rightarrow Ti(OH)_6^{2-} + Ba^{2+} + 4ROH \quad [1]$$

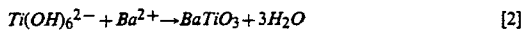
$$Ti(OH)_6^{2-} + Ba^{2+} \rightarrow BaTiO_3 + 3H_2O \quad [2]$$

In the reaction (1), the term $4H_2O$ comes from the hydrated hydroxide $Ba(OH)_2, nH_2O$.

At a pH kept between 11 and 14 in the presence of $OH^-$ ions, 4 molecules of water and 2 hydroxyl groups attack the oxygen atoms of $Ti(OR)_4$ by a nucleophilic process. This reaction is followed by an electronic arrangement with the departure of 4 molecules of water. The result thereof is the formation of anions $Ti(OH)_6^{2-}$ neutralized by the $Ba^{2+}$ ions (reaction 1). The acid-base reaction is followed by a stabilization by internal condensation and departure of water (reaction 2).

These reactions occur when $Ti^{IV}$ is replaced by $Zr^{IV}$ or $Hf^{IV}$ and when $Ba^{II}$ is replaced by $Sr^{II}$. They also occur when these elements are combined in the system $Ba_xSr_{1-x}(Ti_uZr_vHf_2)O_3$.

IMPLEMENTATION OF THE METHOD

The method has a step consisting in the preparation of an alcohol solution containing the metallic alcoholate or alcoholates, depending on whether it is desired to produce titanium, zirconium and/or hafnium. Preferably, the alcohol solution will also have the alcohol or alcohols corresponding to the alcoholates. The quantities, by volume, of the alcohol or alcohols may exceed the quantity of the metallic alcoholate or alcoholates and of the different substituent elements or dopants introduced in the form of alcohol-soluble salts or in the form of metallic alcoholates.

In another step of the method, the hydrated barium or strontium hydroxides are weighed in the solid state, in quantities corresponding to the chosen formulation.

In a following step, violent shaking (for example, through a centrifugal turbine combining the complex action of the following effects: shearing, beating, percussion and ultrasonic cavitation phenomena) is used to incorporate the powder formed by the barium or strontium hydroxide or hydroxides in the alcohol solution. After some minutes of vigorous shaking, the white-coloured mixture, which is initially liquid and has little viscosity, gradually changes into a homogeneous and viscous paste which, by this very fact, imprisons the different elements introduced. It is preferable to do this operation in taking the mixture to a temperature which is greater than the ambient temperature but nevertheless remains smaller than the temperature of evaporation of the alcohols and organic precursors. This has the effect of accelerating the reaction and of making it more complete. The reaction product is then dried. Different drying techniques may be envisaged:

drying by convection (in a oven), drying by radiation (in an radiator type device or by microwaves)

hypercritical drying (in autoclave).

With respect to hypercritical drying, the following observations may be made.

The removal of the solvent under hypercritical conditions makes it possible to get rid of the harmful effect of capillary forces by removing the liquid/gas interface (M. A. VICARINI et al., Bull. Soc. Chim., 1969, No. 5, p. 1466). The powder prepared is finely divided. Furthermore, the combined effect of the pressure and the temperature enable the different reactions (hydrolysis, condensation) to be achieved more quickly and completely. A draining of the organic species is also provided for during the drying proper. The loss of mass after drying is smaller than 10%.

In addition to the receiver containing the product to be dried, the quantity of alcohol needed for the critical pressure to be reached is introduced into the autoclave. The apparatus is closed and then heated until the critical temperature $T_c$ of the solvents is slightly exceeded. The alcohol is then slowly removed and then condensed on a cooling agent. The typical curves representing the temperature T and the pressure P in the autoclave as a function of the time t (in hours) for the duration of an experiment are shown in FIG. 1. The most commonly used solvents are ethanol and isopropanol for which the critical conditions are, respectively, 243° C.—6.51 MPa and 235° C.—4.85 MPa.

For the different drying techniques, an assembly for the recovery of alcohols may be used. After distillation, these alcohols may be used in the preparation of organic precursors (organic alcoholates), for example from metallic chlorides $MCl_4$ (M representing a metal chosen from among zirconium IV, titanium IV, hafnium IV) according to the following reaction:

$$MCl_4 + 4 ROH \longrightarrow M(OR)_4 + 4 \overline{HCl}$$

R being an organic radical.

The powder obtained after drying is already appreciably crystallized, and may be directly shaped.

EXAMPLE 1 barium titanate

The starting reagents are the following:
60.9356 g of titanium isopropoxide (or isopropylate)—a liquid with a density of 0.9550,
63.8 cm$^3$ of isopropanol,
67.6305 g of solid (octahydrated) barium hydroxide.

The first two constituents are poured, in open air, into a dry beaker. The hydroxide is then weighed in a dish before it is incorporated into the alcohol mixture under vigorous shaking. After about one and a half minutes of stirring, the mixture gels in the form of white foam. The container is then placed in a oven (drying at 150° C.) or in a 600 cm$^3$ autoclave in which beforehand, care has been taken to put 118 cm$^3$ of isopropanol (to reach the critical pressure). After closing the autoclave, the heating system is actuated. The temperature is raised to 260° C. at a rate of 8° C./min. The pressure attained at the end of the experiment is 8.5 MPa. The pressure is then slowly relaxed at constant temperature (260° C.). The vapors are condensed on a cooling agent so as to collect the isopropanol which could be used again after distillation.

After the complete cooling of the autoclave (as soon as the value of the pressure is equivalent ot that of the atmospheric pressure), the container can be taken out in order to extract the powder therefrom. This powder is in the form of one or more very crumbly white blocks which can be very finely divided without difficulty.

The powder resulting from these two drying techniques (oven and autoclave) has a specific surface area of the order of 15 m$^2$/g. After compaction (under 2000 bars), the pellets obtained (with density equal to 45% of the theoretical density in the former case and 55% of the theoretical density in the latter case) are processed thermally between 1000° C. and 1300° C.

Figure 2:
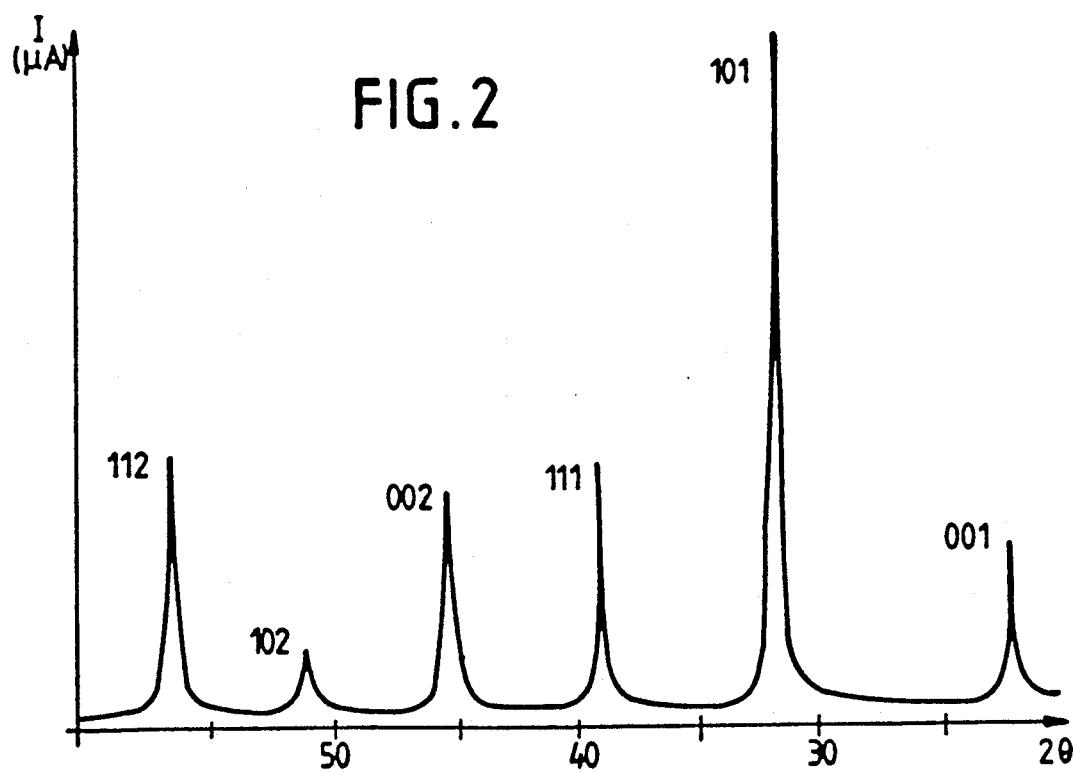
FIG. 2 represents a diffraction spectrum of the X-rays.

FIG. 2 shows the diffraction spectra of the X-rays obtained at ambient temperature (CuK$\alpha$ radiation) from the barium titanate powder when it leaves the autoclave or after oven drying at 150° C. In the graph of FIG. 2, the Y axis represents the diffracted intensity I of an X-ray beam incident at an angle $\theta$ with respect to the crystalline planes of the material studied. The X axis is graduated in $2\theta$. A rise in the temperature leads to a refining of the streaks and to a doubling of some of them, which characterizes the tetragonal deformation. No reaction intermediate element is present during the rise in temperature (absence of Ba$_2$TiO$_4$). FIG. 3 shows the shrinkage curves in $\Delta$L as a function of the temperature T for the materials o (the temperature rising gradient is 3° C./min).

Figure 5:
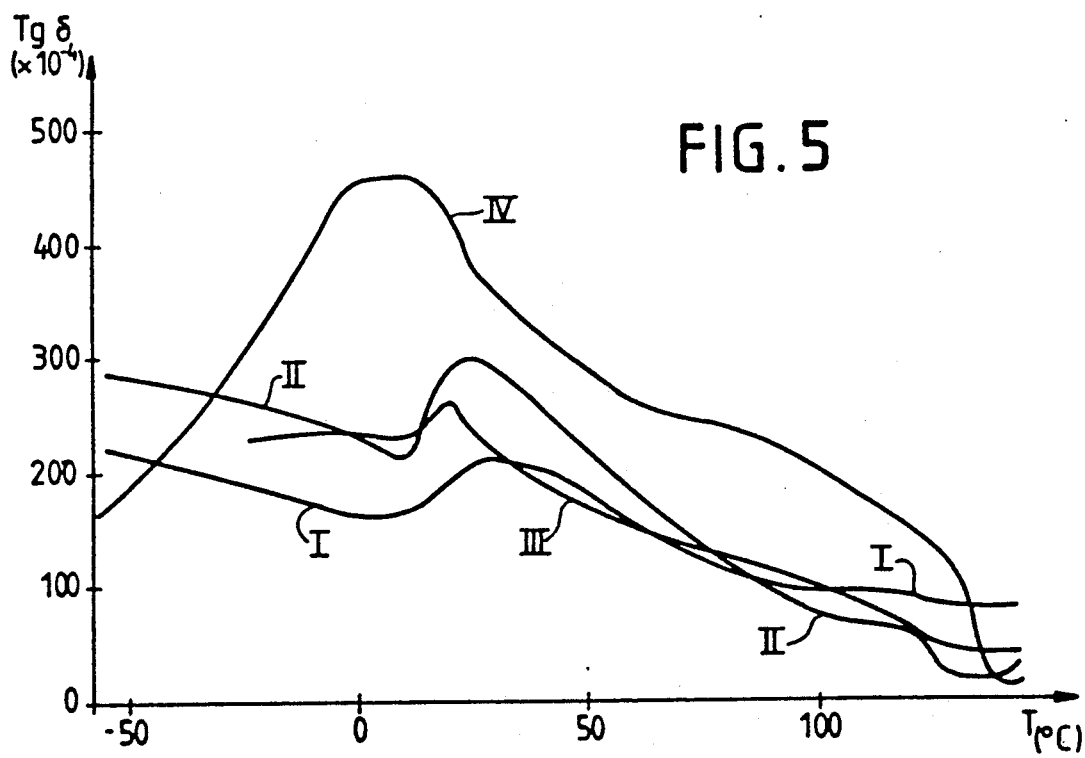

Table 1, placed at the end of the description, brings together some dielectric properties for different samples of BaTiO$_3$ (Ba/Ti=1) oven dried at 150° C. The dielectric constant $\epsilon$ has been measured at 20° C., and for a frequency of 1 kHz. The loss tangent tg$\delta$ (or dissipation factor) has been measured under the same conditions. The dielectric properties are given for different sintering temperatures (150° C./h, two hours at steady temperature) and the measurements were made on samples numbered I to IV and prepared in the form of disk capacitors. FIGS. 4 and 5 represent the change, as a function of the temperature T, of the dielectric constant $\epsilon$ and of the loss tangent tg$\delta$ of the samples I to IV.

Figure 6:
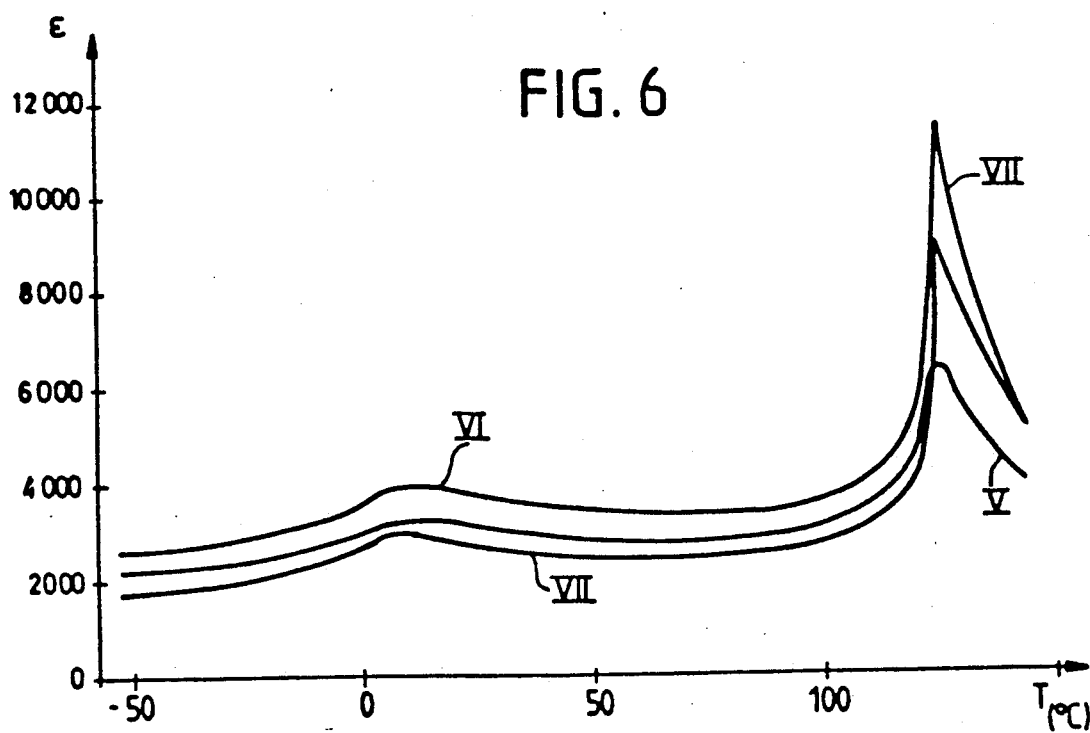
Figure 7:
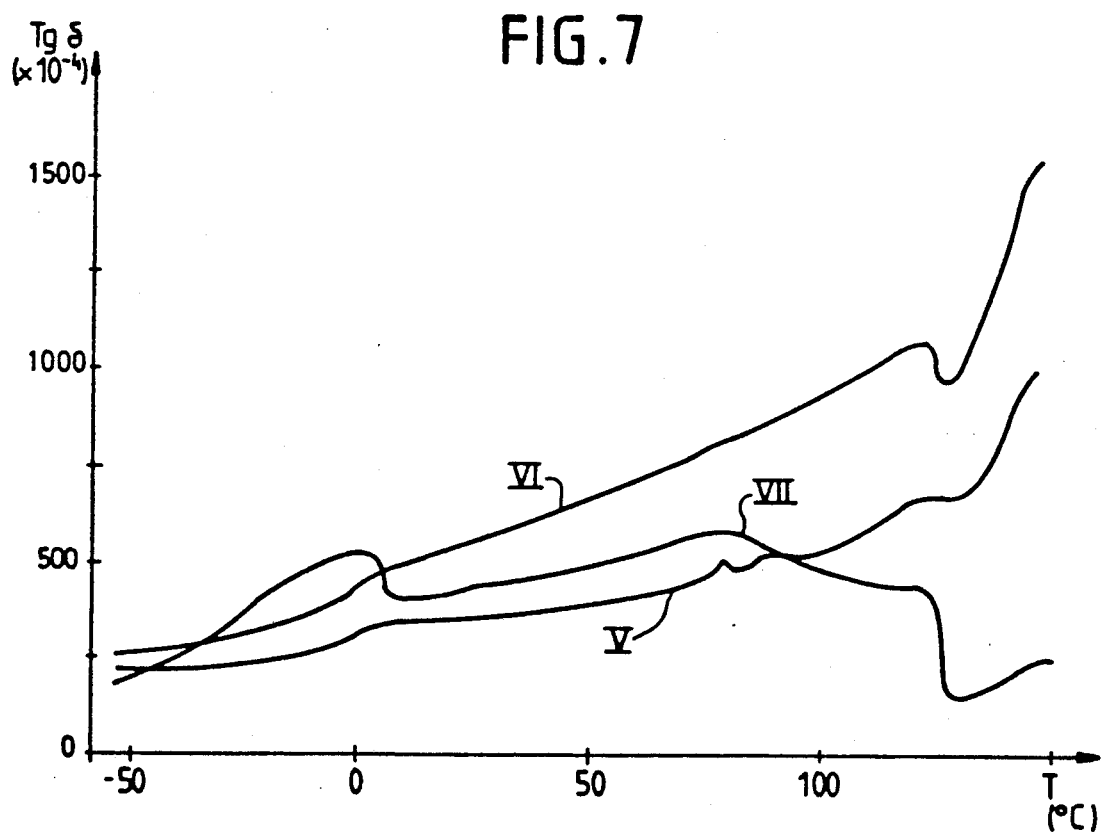

Table 2, placed at the end of the description, brings together some dielectric properties for different samples of BaTiO$_3$ (Ba/Ti=1) dried in autoclave (hypercritical drying: 260° C., 8.5 MPa). As above, the dielectric constant $\epsilon$ and the loss tangent tg$\delta$ have been measured at 20° C., and under 1 kHz. The dielectric properties are given for different sintering temperatures (150° C./h, two hours at steady temperature) and the measurements were made on samples numbered V to VII and prepared in the form of disk capacitors. FIGS. 6 and 7 represent the change, as a function of the temperature T, of the dielectric constant $\epsilon$ and of the loss tangent tg$\delta$ of the samples V to VII.

EXAMPLE 2

Preparation of strontium zirconate.

The starting reagents are the following:
93.0864 g of zirconium n-propoxide (or propylate) (a liquid with a density of 1.05 and having a zirconium content, by mass, of 21.6%).
88.5 cm$^3$ of isopropanol,
58.5787 g of strontium hydroxide (octahydrated).

The mode of operation is equivalent to the previous one (used during the preparation of barium titanate). After about two minutes of stirring, the mixture gels in the form of a clear, yellow foam. The quantity of isopropylic alcohol added to achieve the critical pressure is 58 cm$^3$. After closing the autoclave, the heating system is programmed so that the temperature reached is 275° C. (8° C./min). The pressure is then equal to 8.5 MPa.

EXAMPLE 3 preparation of combined barium-strontium titanate

The starting reagents are the following:
44.554 g of titanium isopropoxide (or isopropylate)—a liquid with a density of 0.9550,
46.5 cm$^3$ of isopropanol,
39.5593 g of barium hydroxide (octahydrated)
8.3311 g of strontium hydroxide (octahydrated).

The mode of operation is still equivalent to the previous one. During the mixing, one hydroxide (barium for example) is introduced, and then the other one. The intimate mixing (at the molecular level) takes place during the vigorous stirring stage.

EXAMPLE 4 preparation of BaTi$_{0.76}$Hf$_{0.24}$O$_3$

The starting reagents are the following:
16.3540 g of hafnium butoxide (or butylate) (liquid with a density of 1 and having a hafnium oxide content, by mass, of 46,7%).
32.6610 g of titanium isopropoxide (or isopropylate)—a liquid with a density of 0.955
49 cm$^3$ of isopropanol,
47.6949 g of barium hydroxide (octahydrated)

The mode of operation is equivalent to that of example 1 (barium titanate).

After about two minutes of stirring, the mixture gels in the form of a white foam which subsequently undergoes oven drying at 150° C.

Figure 8:
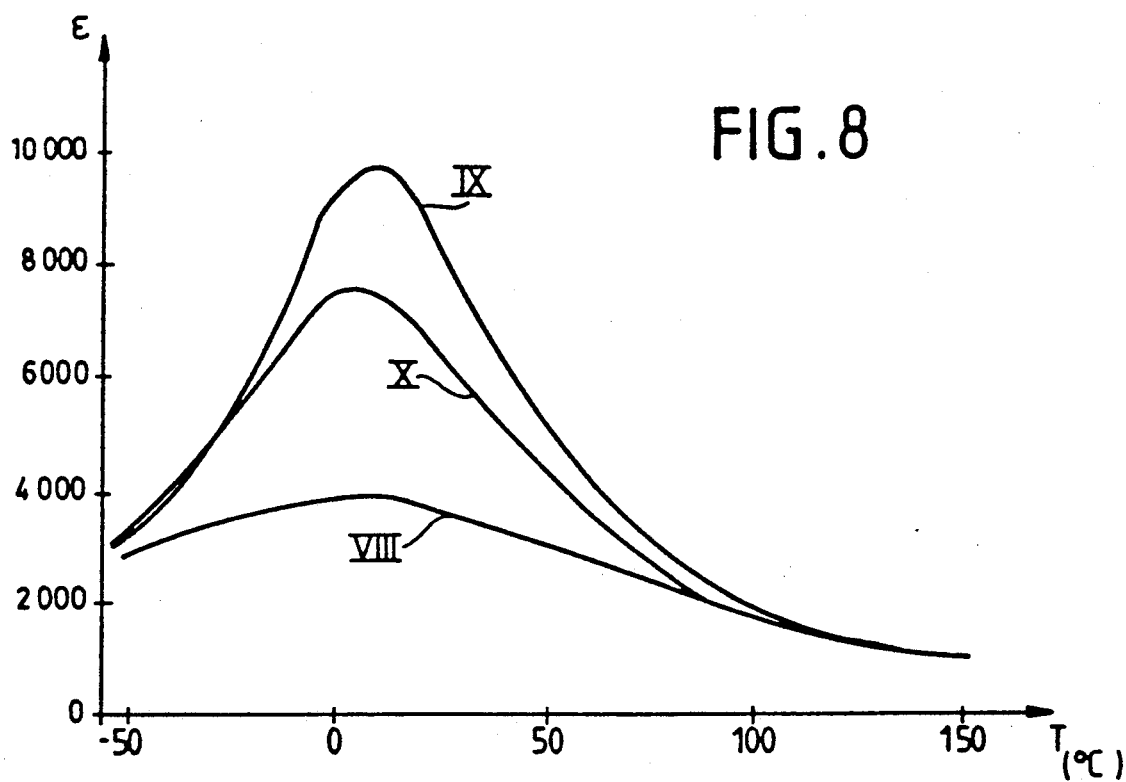
Figure 9:
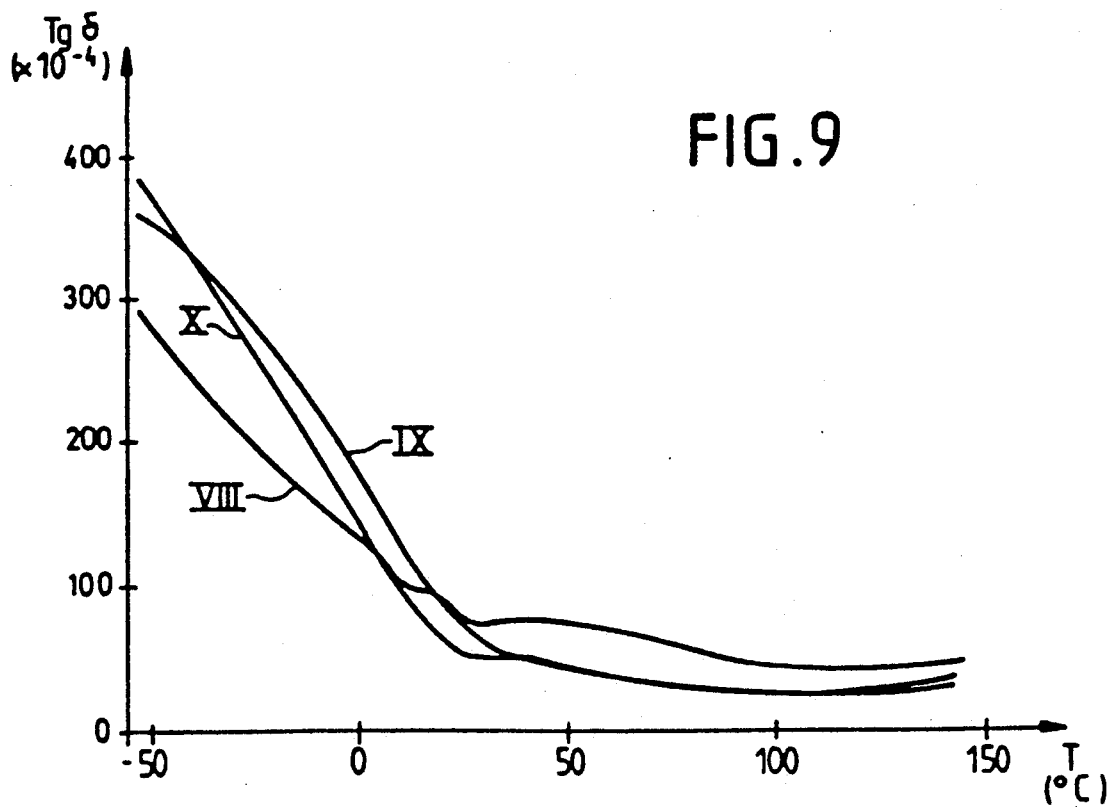

Table 3, placed at the end of the description, brings together some dielectric properties for different samples of $BaTi_{0.76}Hf_{0.24}O_3$ oven dried at 150° C. The dielectric constant $\epsilon$ has been measured at 20° C., and for a frequency of 1 kHz. The loss tangent $tg\delta$ has been measured under the same conditions. The dielectric properties are given for different sintering temperatures (150° C./h, two hours at steady temperature) and the measurements were made on samples numbered VIII to X and prepared in the form of disk capacitors. FIGS. 8 and 9 represent the change, as a function of the temperature T, of the dielectric constant $\epsilon$ and of the loss tangent $tg\delta$ of the samples VIII to X.

EXAMPLE 5 preparation of a complex compound $Ba_{0.884}Ca_{0.116}Ti_{0.824}Zr_{0.176}O_3$

The starting reagents are the following:
- 45.4351 g of titanium isopropoxide (or isopropylate) (a liquid with a density of 0.9550)
- 13.1971 g of zirconium butoxide (or butylate) (a liquid with a density of 1.0650)
- 48 cm³ of isopropanol,
- 13 cm³ of butanol
- 5.4216 g of calcium nitrate (tetrahydrated)
- 54.1044 g of barium hydroxide (octahydrated).

In addition to the different alkoxides (or alcoholates) and the different alcohols, the solution includes calcium nitrate. During the mixing, solid barium hydroxide is introduced under vigorous shaking, after which a white foam is obtained.

Table 4, placed at the end of the description, brings together some dielectric properties for different samples of $Ba_{0.884}Ca_{0.116}Ti_{0.824}Zr_{0.176}O_3$ oven dried at 150° C. The dielectric constant and the loss tangent were measured under the same conditions as earlier. The dielectric properties are given for different sintering temperatures (150° C./h, two hours at steady temperature) and the measurements were made on samples numbered XI to XIV, and prepared in the form of disk capacitors. FIGS. 10 and 11 represent the change, as a function of the temperature T, of the dielectric constant $\epsilon$ and of the loss tangent $tg\delta$ of the samples XI to XIV.

TABLE 1

| Sample No. | Sintering temperature | $\epsilon$ | $tg\,\delta$ $(\times 10^{-4})$ |
|---|---|---|---|
| I | 1100° C. | 3889 | 190 |
| II | 1150° C. | 5466 | 290 |
| III | 1200° C. | 4091 | 263 |
| IV | 1300° C. | 3499 | 423 |

TABLE 2

| Sample No. | Sintering temperature | $\epsilon$ | $tg\,\delta$ $(\times 10^{-4})$ |
|---|---|---|---|
| V | 1150° C. | 3107 | 347 |
| VI | 1200° C. | 3773 | 529 |
| VII | 1400° C. | 2687 | 422 |

TABLE 3

| Sample No. | Sintering temperature | $\epsilon$ | $tg\,\delta$ $(\times 10^{-4})$ |
|---|---|---|---|
| VIII | 1300° C. | 3758 | 90 |
| IX | 1350° C. | 9010 | 83 |
| X | 1400° C. | 6810 | 60 |

TABLE 4

| Sample No. | Sintering temperature | $\epsilon$ | $tg\,\delta$ |
|---|---|---|---|
| XI | 1300° C. | 2161 | 60 |
| XII | 1350° C. | 3341 | 65 |
| XIII | 1400° C. | 3124 | 71 |
| XIV | 1450° C. | 4071 | 69 |

What is claimed is:

1. A method for the fabrication, by chemical process, of a ceramic material comprising a compound belonging to the system:

with $0 \leq X \leq 1$, where the coefficients u, v and w may be zero, but at least one of them is not zero and 0.95 u+v+w 1.05, said method comprising the following steps:
   (i) mixing the alcohol with at least one alcoholate selected from the group consisting of a titanium alcoholate, a zirconium alcoholate and a hafnium alcoholate, to obtain a solution;
   (ii) adding at least one of hydrated barium hydroxide and hydrated strontium hydroxide in the solid state to said solution, with agitation, to obtain a perovskite phase in the form of a paste;
   (iii) drying said paste, to obtain a powder; and
   (iv) sintering said powder, to obtain said ceramic material.

2. A method according to claim 1, wherein the alcoholates are of the type:

$Zr(OR)_4$, $Ti(OR)_4$ and $Hf(OR)_4$,

R representing an alkyl group that may contain 1 to 5 carbon atoms.

3. A method according to claim 1, wherein the drying is done either by convection or by radiation or in an autoclave to achieve hypercritical drying.

4. A ceramic material according to claim 1, comprising a partial substitution of titanium and/or zirconium and/or hafnium atoms.

5. The method of claim 1, wherein said alcohol comprises an alcohol which corresponds to said alcoholate.

6. The method of claim 1, wherein said ceramic material further comprises at least one substituent or dopant and said substituent or dopant is introduced into said solution in the form of an alcoholate or a salt soluble in said solution.

7. A method according to claim 6, wherein said soluble salt is a nitrate.

8. The ceramic material of claim 5, wherein at least one of said titanium, zirconium, and hafnium is replaced by (a) a mixture of elements M and M' in the respective proportions of ⅔ and ⅓, or by (b) a mixture of elements M and M'' in the respective proportions of ¾ and ¼, M representing at least one metal chosen from among tantalum and niobium, M' representing at least one metal chose from among magnesium, zinc and manganese, and M'' representing at least one metal chose from among lithium, sodium and potassium.

9. The ceramic material of claim 4, further comprising at least one dopant selected from the group consisting of calcium, magnesium, zinc, one ion of a transition metal such as niobium, tantalum, copper, manganese, cobalt, one alkaline ion, lanthanum, yttrium, antimony, and lead.

* * * * *